US007742479B1

(12) United States Patent
Kotha et al.

(10) Patent No.: US 7,742,479 B1
(45) Date of Patent: Jun. 22, 2010

(54) METHOD AND APPARATUS FOR DYNAMIC NETWORK ADDRESS REASSIGNMENT EMPLOYING INTERIM NETWORK ADDRESS TRANSLATION

(75) Inventors: Murty Subba Rama Chandra Kotha, Sunnyvale, CA (US); Richard Manfred Pruss, Tewantin (AU); Matthew Lawrence King, Headley Down (GB)

(73) Assignee: Cisco Technology, Inc., San Jose, CA (US)

( * ) Notice: Subject to any disclaimer, the term of this patent is extended or adjusted under 35 U.S.C. 154(b) by 645 days.

(21) Appl. No.: 11/607,585

(22) Filed: Dec. 1, 2006

(51) Int. Cl.
*H04L 12/28* (2006.01)
*H04L 12/56* (2006.01)
(52) U.S. Cl. .................. 370/392; 370/397; 370/401
(58) Field of Classification Search .................. None
See application file for complete search history.

(56) References Cited

U.S. PATENT DOCUMENTS

| 6,687,245 | B2 * | 2/2004 | Fangman et al. | ............. 370/356 |
| 6,952,428 | B1 * | 10/2005 | Necka et al. | ................. 370/466 |
| 2003/0054810 | A1 | 3/2003 | Chen et al. | |
| 2003/0088698 | A1 | 5/2003 | Singh et al. | |
| 2003/0182363 | A1 * | 9/2003 | Clough et al. | ................ 709/203 |
| 2004/0218611 | A1 | 11/2004 | Kim | |
| 2005/0165953 | A1 * | 7/2005 | Oba et al. | .................... 709/238 |

OTHER PUBLICATIONS

Droms, R., "RFC 2131—Dynamic Host Configuration Protocol", The Internet Engineering Task Force, Mar. 1997, http://www.ietf.org//rfc/rfc2131.txt.

Egevang, K.; Francis, P., "RFC 1631—The IP Network Address Translator (NAT)", Internet RFC/STD/FYI/BCP Archives, May 1994, http://www.faqs.org/rfcs//rfc1631.html.
McGregor, G., "RFC 1332—The PPP Internet Protocol Control Protocol (IPCP)", Internet RFC/STD/FYI/BCP Archives, May 1992, http://www.faqs.org/rfcs/rfc1332.html.
"Configuring ISG VRF Transfer (Cisco IOS Release 12.2(28)SB)", Cisco IOS Intelligent Service Gateway Configuration Guide, Release 12.2 SB, Mar. 2006, http://www.cisco.com/en/US/products/ps6566/products_configuration_guide_chapter09186a0080630d78.html.
"Configuring ISG Access for PPP Sessions", Cisco IOS Intelligent Service Gateway Configuration Guide, Release 12.2 SB, Mar. 2006, http://www.cisco.com/en/US/products/ps6566/products_configuration_guide_chapter09186a0080630d61.html.
U.S. Appl. No. 11/639,060, filed Dec. 14, 2006 entitled, "Dynamic, Policy Based, Per-Subscriber Selection and Transfer Among Virtual Private Networks."

* cited by examiner

*Primary Examiner*—Gregory B Sefcheck
*Assistant Examiner*—Nima Mahmoudzadeh
(74) *Attorney, Agent, or Firm*—BainwoodHuang

(57) ABSTRACT

An edge router termed a "service gateway" operates to reassign network addresses such as Internet Protocol (IP) addresses to a subscriber, such as when the subscriber is to be transitioned from a first virtual private network (VPN) to a second VPN. The service gateway obtains a new network address routable in a second VPN and applies dynamic edge network address translation (NAT) on an interim basis to provide instant access to the second VPN (following web-based identification for example), while a prior lease for an initial network address not routable in the second VPN is still in effect. When the subscriber attempts to renew the lease in due course, the renewal request is rejected, which forces the subscriber to re-initiate dynamic host control protocol (DHCP) procedures to obtain a new network address. At this point, the interim NAT mapping is removed and the new network address is assigned directly to the subscriber via DHCP. This approach combines the benefits of DHCP and NAT while minimizing dead time on the network and the processing overhead associated with alternative approaches.

20 Claims, 6 Drawing Sheets

METHOD AND APPARATUS FOR DYNAMIC NETWORK ADDRESS REASSIGNMENT EMPLOYING INTERIM NETWORK ADDRESS TRANSLATION

BACKGROUND

The present invention is related to the field of data communications networks.

It is known to use network devices such as routers, switches and bridges to forward data packets within data communications networks. A router is an example of a device operating at the network layer, or layer 3 of the well-known Open Systems Interconnect (OSI) model. Bridges and switches are examples of layer-2 devices.

It is known to define so-called "virtual private networks" or VPNs within larger (often public) networks such as the global Internet. A VPN can be seen as a collection of specialized network devices and/or specialized functions on otherwise standard network devices that co-operate to carry out data communications in a manner that segregates such communications from other data communications carried by the larger network. There are a variety of known VPN technologies, including technologies based on the Internet Protocol (IP), virtual local area network (VLAN) technologies, and virtual private dial-up networks (VPDNs). Routers may offer support for layer-3 VPNs through the use of multiple so-called "virtual routing and forwarding." tables or VRFs. The VRFs correspond to multiple independent "virtual routers" within a physical router, with each virtual router operating as a node on a corresponding VPN. VLANs generally employ bridging or switching instances located within network devices.

BRIEF DESCRIPTION OF THE DRAWINGS

Example embodiments of the present invention are described with reference to the accompanying drawings, in which.

DESCRIPTION OF EXAMPLE EMBODIMENTS

Overview

Figure 1:
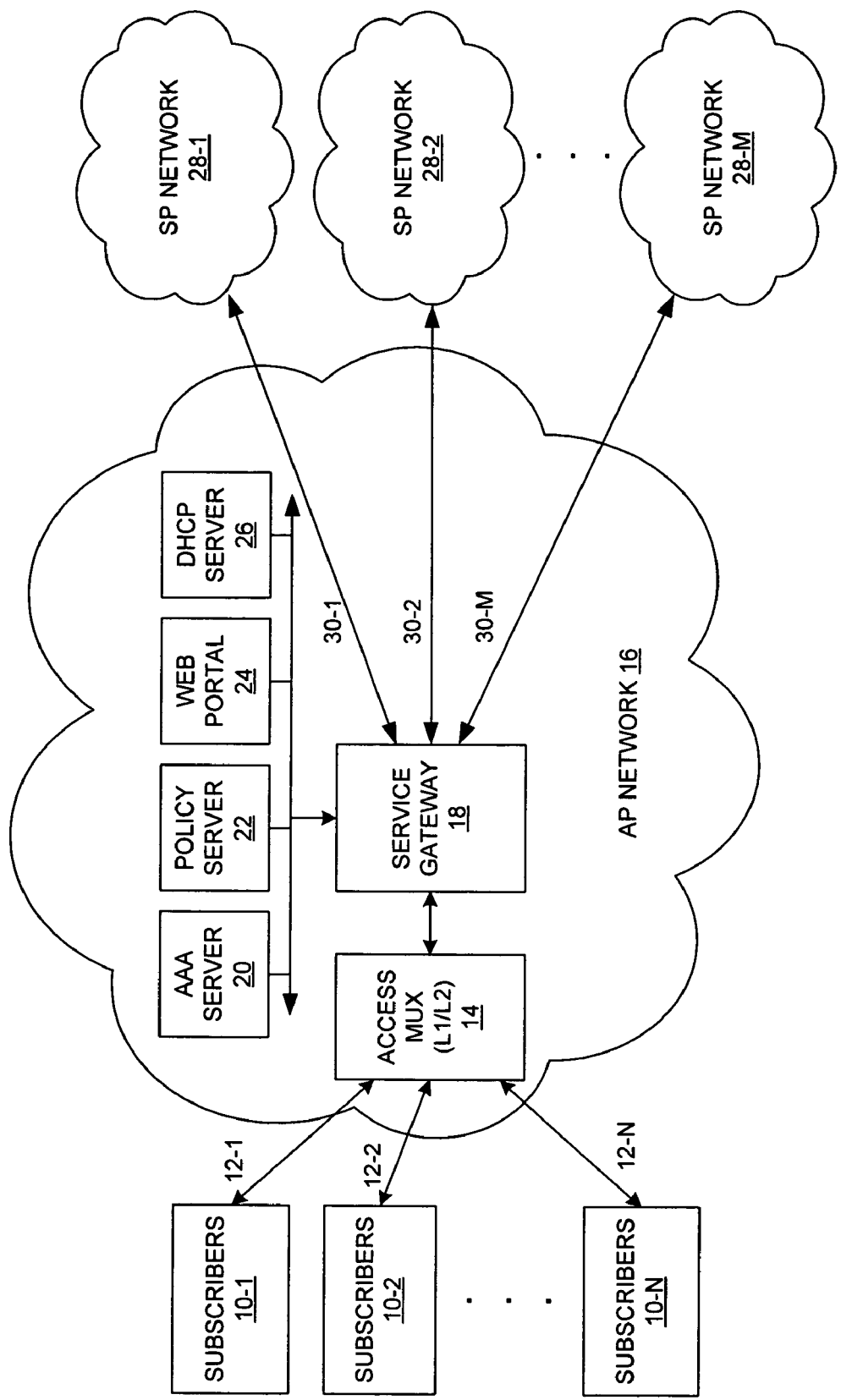
FIG. 1 is a block diagram of a computer network having subscribers and multiple layer-3 service provider (SP) networks.

VPN technologies are being used to expand virtual-private-networking closer to the initial network access point for subscribers. Data service providers that in the past have operated relatively centralized networks with dial-in access for subscribers are now pushing their networks closer to subscribers, who in turn are making greater use of Ethernet connectivity which lends itself to integration in VPNs more naturally than does conventional dial-up technology. Additionally, in some areas it is required that so-called "network access providers" (also referred to as "access providers" or APs) that have direct physical connections with subscribers provide subscriber access to other service providers. A further factor shaping the operations of edge devices such as edge routers is the lack of native identification and authentication functions within the Internet Protocol (IP). APs may provide networks dedicated for these and related functions that are performed upon initial subscriber interaction, before the subscriber actually begins utilizing a desired service that is delivered via a corresponding VPN. Thus, there is a need for edge devices capable of managing the involvement of subscribers with multiple VPNs, including the important task of dynamically re-assigning network addresses to the subscribers as their membership among the VPNs changes.

There are known techniques for dynamically changing the network address that identifies a subscriber in network data packets. In the context of IP sessions, a protocol known as Dynamic Host Control Protocol (DHCP) may be utilized. Using DHCP, a subscriber obtains a first network address for a predefined interval known as a "lease" interval. The subscriber must periodically renew the lease in order to continue using the address. When the subscriber attempts to renew the lease, the request can be rejected, forcing the subscriber to obtain a new address. At this point the subscriber can be given a second address different from the first address. One drawback to using DHCP is delay associated with allowing a lease period to expire before an address change can be made.

As an alternative, a mechanism known as network address translation (NAT) can be utilized. The subscriber continues to use only the first network address, but an edge network device performs a translation between the first network address and some second network address utilized in the network. This mapping can be dynamically changed in order to change the address that identifies the subscriber in the network packets. Because no lease period is involved, NAT can avoid the delays associated with dynamic reassignment using DHCP. However, NAT can cause other problems, including reduced overall performance due to the packet-by-packet translation, and potential incompatibility with some applications that incorporate operating assumptions that are inconsistent with NAT.

An edge router termed a "service gateway" is disclosed which obtains a new network address routable in the selected service network and applies network address translation (NAT) on an interim basis to provide immediate access to a subscribed service domain (following web-based identification for example) while the lease for an initial IP address is still in effect. When the subscriber attempts to renew the lease in due course, the renewal request is rejected, which forces the subscriber to re-initiate DHCP to obtain a new address. At this point, the NAT mapping is removed and the new address is assigned directly to the subscriber via DHCP. This approach combines the benefits of DHCP and NAT to provide an optimal user experience while avoiding the overhead and other drawbacks of each method individually.

More generally, a subscriber is added to a virtual private network (VPN) by a method which is carried out in part during an interim period in which the subscriber attempts to exchange subscriber data packets with the VPN using a first network address. During this interim period, a second network address that is routable in the VPN is obtained on behalf of the subscriber, and network address translation is performed to translate between the subscriber data packets and corresponding network data packets in the VPN, where each network data packet includes the same information as a corresponding subscriber data packet but identifies the subscriber by the second network address instead of the first network address. Upon the subscriber reaching an operating condition in which the subscriber can become configured with a new network address, the second network address is provided to the subscriber for use by the subscriber in exchanging future data packets with the VPN. Subsequently, direct, non-translated exchange of the future data packets between the subscriber and the VPN is permitted.

In one embodiment, the second network address may be obtained using a proxy client capability of a dynamic network address assignment protocol such as DHCP. The subscriber may obtain the first network address on a temporary lease basis and reach the operating condition when the temporary lease of the first network address has expired. In this case, the second network address is provided to the subscriber by (1) rejecting an attempt by the subscriber to renew the lease of the first network address, and (2) providing the second network address to the subscriber in response to a subsequent request by the subscriber for a new network address.

The VPN may be a service provider (SP) network separate from and reachable via an access provider (AP) network in which the first network address is routable, wherein the subscriber has a direct physical connection to the AP network but not to the SP network.

Other features and advantages will be apparent from the detailed description below.

DETAILED DESCRIPTION

FIG. 1 shows a computer network in which subscribers 10 (shown as 10-1, 10-2, ..., 10-N) are connected by respective subscriber links 12 (shown as 12-1, 12-2, ..., 12-N) to an access multiplexer (ACCESS MUX) 14 within an access provider (AP) network 16. The access multiplexer 14 is typically a layer-1 or layer-2 (L1/L2) device according to the well-known Open Systems Interconnect (OSI) seven-layer model. Within the AP network 16, the access multiplexer 14 is coupled to a service gateway 18, which includes data packet routing and/or forwarding functionality as well as higher-level functionality as described below. The service gateway 18 may be coupled to various servers including an authentication, authorization and accounting (AAA) server 20, a policy server 22, a web portal 24, and a Dynamic Host Control Protocol (DHCP) server 26. The service gateway 18 is also coupled to service provider (SP) networks 28 (shown as 28-1, 28-2, ..., 28-M) via network links 30 (shown as 30-1, 30-2, ..., 30-M). In a common contemporary configuration, the links 30 may be so-called "label-switched paths" (LSPs) of a Multi-Protocol Label Switched (MPLS) infrastructure. As described in more detail below, the service gateway 18 is seen as a node on each of the SP networks 28. The SP networks 28 are layer-2 or layer-3 VPNs such as virtual local area networks (VLANs), virtual private dial-up networks (VP-DNs) or IP VPNs. The network communications between the service gateway 18 and each of the SP networks 28 are carried over the network links 30.

In the system of FIG. 1, each subscriber 10 represents either an individual subscriber device (such as a personal computer) or collections of individual subscriber devices that access the AP network 16 over the associated subscriber link 12. Examples of the latter include a plurality of subscriber devices on a local-area network (LAN) that access the respective link 12 via a router and/or a modem such as a cable modem or digital subscriber loop (DSL) modem. The access multiplexer 18 may be any of various devices including a DSL access multiplexer (DSLAM) or a cable modem termination system (CMTS) for example.

The AP network 16 is often operated by a telecommunications service provider or "carrier" that provides subscribers 10 physical access to a wide-area communications system or network. In the US, examples of such access providers include cable companies such as Comcast and telephone companies such as Verizon. In addition to providing the physical network connectivity, these access providers often provide Internet service and/or other data services, which may or may not be on a subscription basis. In the present description, the AP network 16 is also referred to as the "local" network. The SP networks 28 are assumed to be layer-2 or layer-3 networks that the subscribers 10 desire to have access to even though they do not have direct physical connectivity to them. Examples of such SP networks 28 include America Online (AOL) and Earthlink. In some areas of the world, it is legally mandated that AP networks 16 provide for access to third-party SP networks 28, to foster competition in the market for Internet/data services.

The service gateway 18 incorporates the functionality of layer-2 forwarding and/or layer-3 routing as well as higher-level functions as described herein. In connection with these higher-level functions, the service gateway 18 interacts with the various servers 20-26 of the AP network 16 (and/or similar servers of the SP network(s) 28 as described below). The AAA server 20 is used as part of managing the subscribers 10 as customers, including such functions as confirming subscriber identity and tracking subscriber usage for billing purposes. The policy server 22 oversees the dynamic aspect of the configuration by acting as a policy decision point with the ability to push new configuration to enforcement points such as the service gateway 18. Examples are given below. The web portal 24 serves as a point of interaction for the subscribers 10 when they initiate a session. The DHCP server 26 is used for dynamic assignment of network addresses (e.g. IP addresses) and other configuration information to DHCP clients among the subscribers 10. One or more of the AAA, policy server, web portal, and DHCP functions may be incorporated within the service gateway itself 18 in alternative embodiments. With respect to the DHCP function, it may be desirable to employ multiple DHCP servers in an alternative embodiment, with each DHCP server being associated with a different SP network 28 for example.

As noted, one or more of the SP networks 28 may include its own set of servers such as AAA servers, policy servers, DHCP servers and web portals for use by subscribers specifically associated with such SP networks 28. The servers 20-26 within the AP network 16 can be seen as being shared among multiple service providers, especially among those SP networks 28 not having their own set of such servers.

Figure 2:
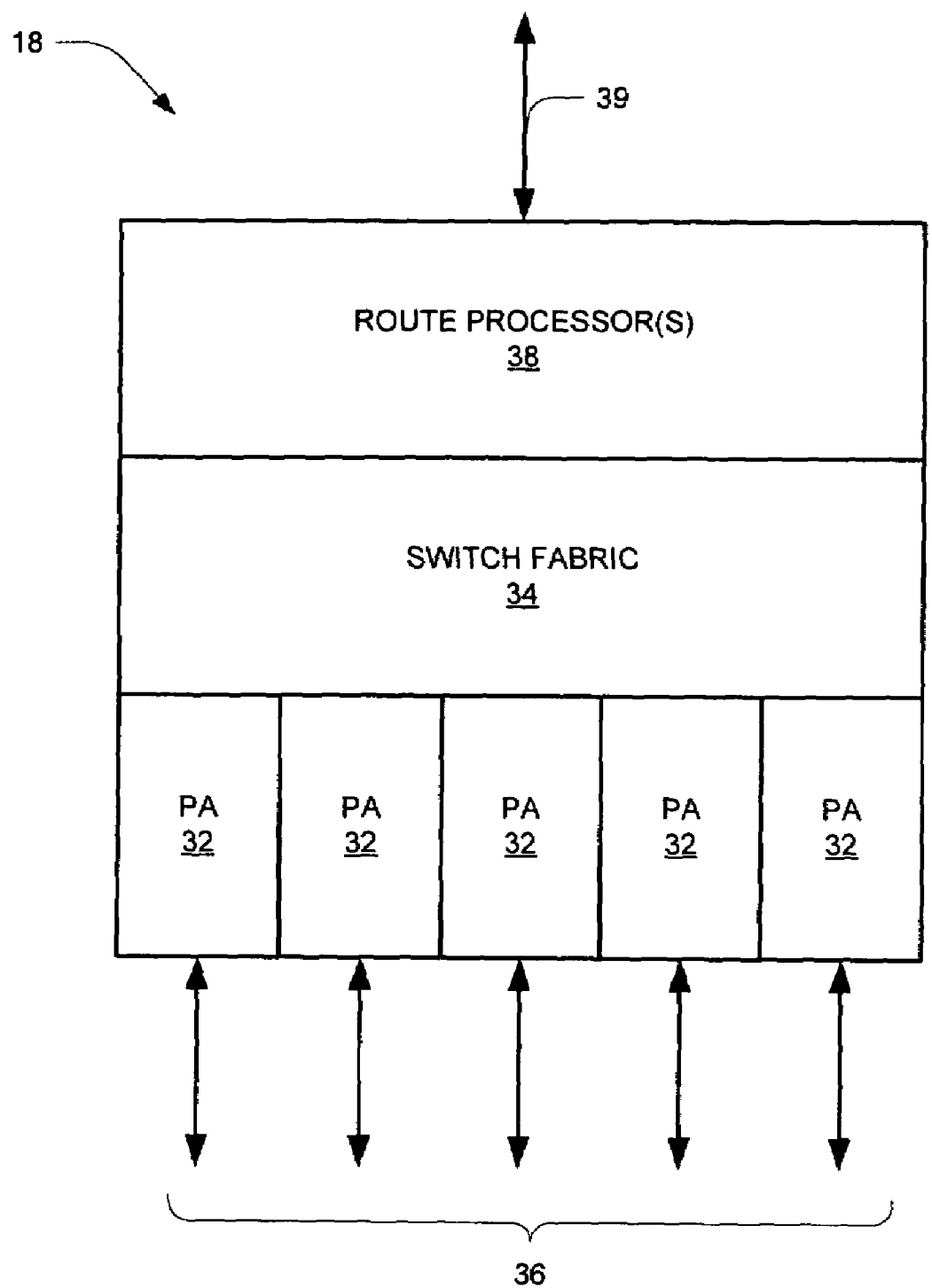
FIG. 2 is a hardware block diagram of a service gateway within the computer network of FIG. 1.

FIG. 2 is a hardware block diagram of one embodiment of the service gateway 18. A plurality of port adapters (PA) 32 are coupled to a switch fabric 34. Each port adapter 32 provides a connection to one or more physical communications links 36, which may be Gigabit Ethernet (GbE) links or fiber-optic links such as Optical Carrier links (OC-12, OC-48 etc.). Each PA 32 may also provide other functions (such as packet forwarding) specific to the traffic appearing on the attached link 36. The physical communications links 36 connect to other devices within the AP network 16 or an SP network 28, and carry the LSPs or other links 30 of FIG. 1. The service gateway 18 also includes one or more route processors 38 that control higher-level operation, including execution of the packet routing and forwarding protocol(s) for example. A route processor 38 may have a separate communications link 39 for operations, administrative and maintenance purposes. In operation, each port adapter 32 may include one or more high-speed forwarding engines populated with forwarding information derived from a complete routing table maintained by the route processor(s) 38. Packets are forwarded from ingress ports to egress ports via the switch fabric 34.

Alternative embodiments of the service gateway 18 may employ different specific hardware configurations. For example, the functions ascribed to the route processor 38 may be performed by one or more processors, which may be centralized or may be distributed among different hardware elements. Both the route processor 38 and such alternative processor arrangements are included within the general term "processor" utilized herein. Also, in an alternative embodiment, the PAs 32 may omit the specialized forwarding engines mentioned above.

Figure 3:
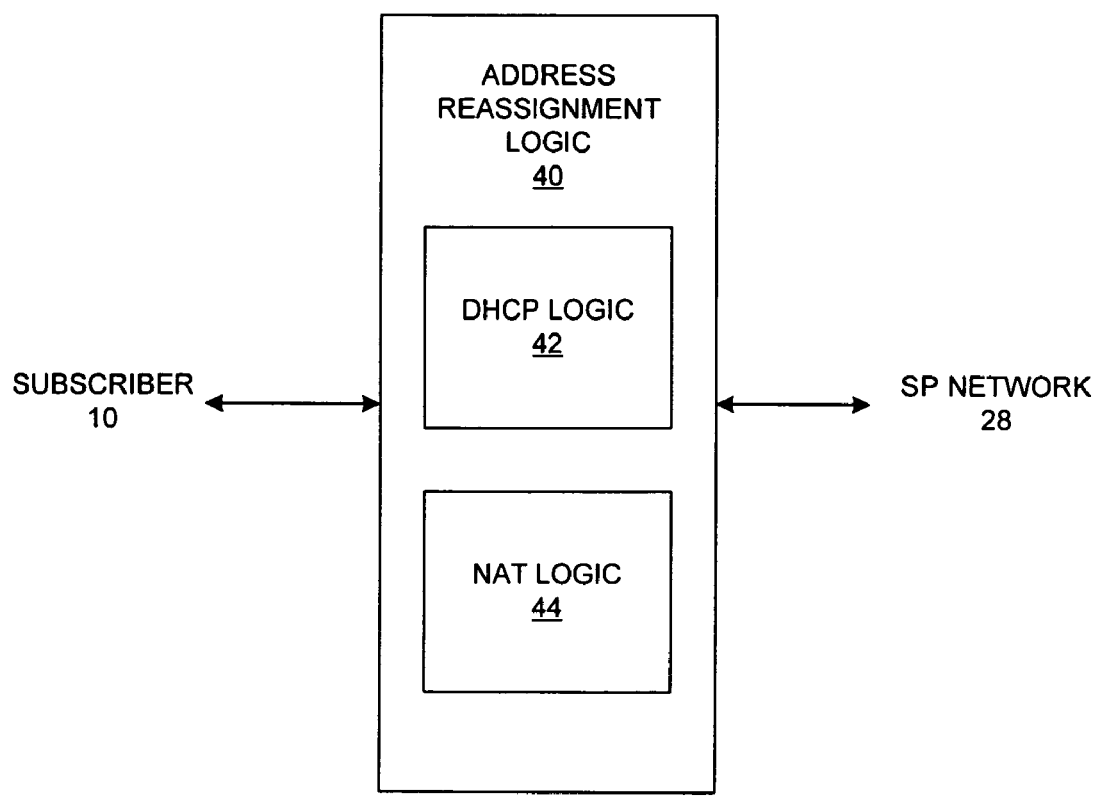
FIG. 3 is a block diagram of operating software referred to as "address reassignment logic" in the service gateway of FIG. 2.

FIG. 3 is a simplified block diagram of certain operating software executed by the processor of the service gateway 18, specifically operating software referred to as "address reassignment logic" 40. This software is responsible for assigning new network addresses to subscribers 10. In the illustrated embodiment, address reassignment takes place under specific operating conditions that are described in more detail below. However, it will be appreciated that address reassignment as described herein may have application in a variety of operating environments, specifically in operating environments in which an addressed entity (such as a subscriber 10) is to experience continuous operation throughout an operating transition that involves changing the entity's network address. In the illustrated embodiment, such a transition occurs in the context of transferring a subscriber 10 from one VPN to another, but there may be analogous operating contexts in which such operation is necessary or desired.

The address reassignment logic 40 includes DHCP logic 42 and network address translation (NAT) logic 44. FIG. 3 illustrates a single instance of the address reassignment logic 40 that operates between a single subscriber 10 and a corresponding SP network 28. It will be appreciated that at any given moment of operation there may be numerous instances of this logic executing one for each subscriber 10 that is involved in an address reassignment operation.

The DHCP logic 42 is responsible for the aspects of address reassignment that involve DHCP functionality. The DHCP logic 42 monitors and, in some cases, modifies the DHCP traffic flowing between the subscriber 10 and a DHCP server (which may be in the SP network 28). In some cases, it acts as a proxy client on behalf of the subscriber 10, and in other cases it mimics functions of the remote DHCP server in interacting with a subscriber 10. These operations are described in some detail below.

The NAT logic 44 is responsible for the aspects of address reassignment that involve NAT functionality. Fundamentally, NAT involves the creation, maintenance and use of mappings between pairs of addresses, where one address of each pair identifies a subscriber 10 on the subscriber side of the service gateway 18 (FIG. 1) and the other address identifies the same subscriber on the SP network side of the service gateway 18. This logic is utilized in the manner described below.

Figure 4:
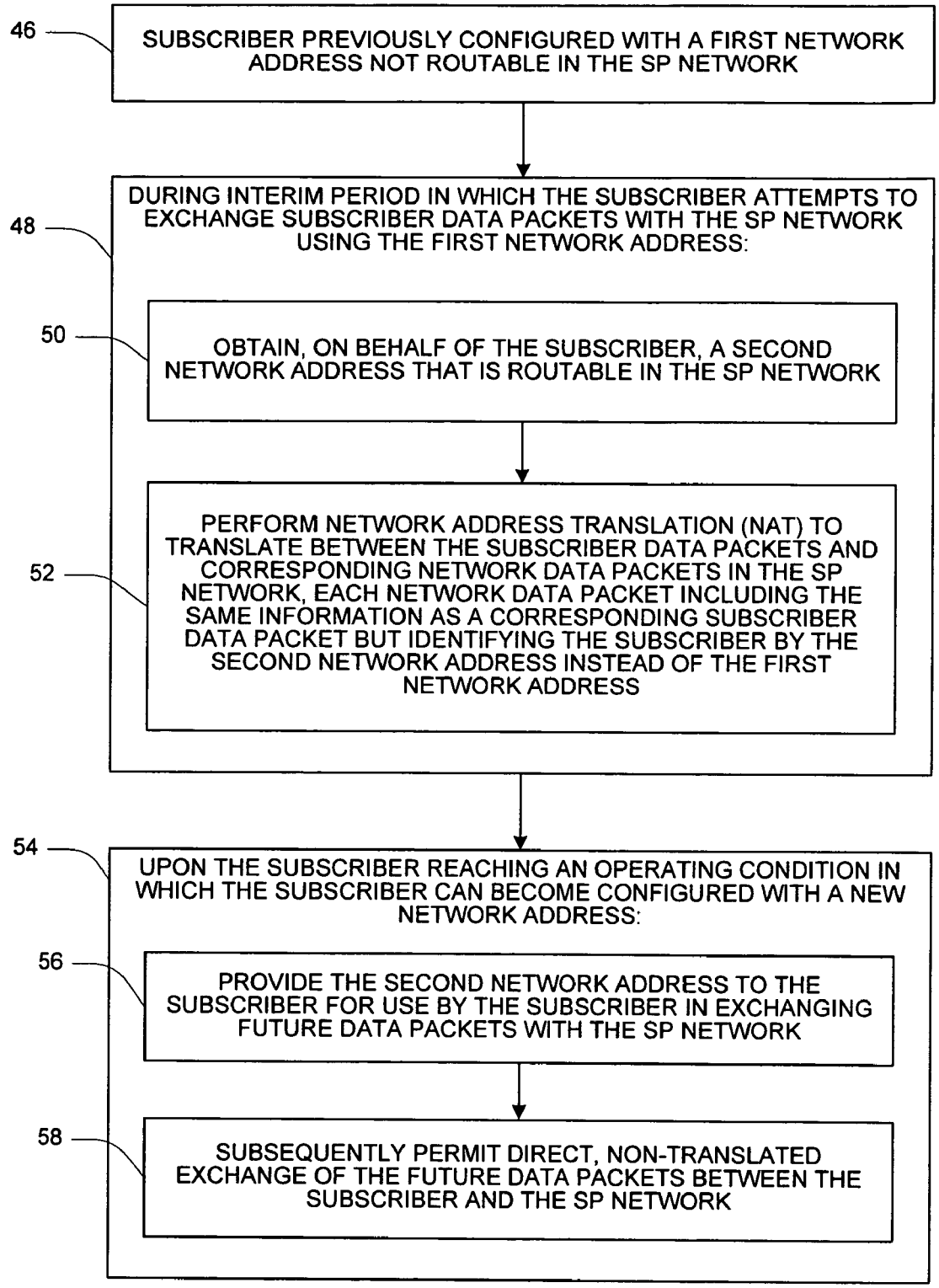
FIG. 4 is a flow diagram depicting the operation of the address reassignment logic of FIG. 3.

FIG. 4 illustrates salient aspects of an address reassignment process carried out by the address reassignment logic 40. As indicated above, this process occurs when a subscriber 10 is to be added to one of the SP networks 28. In the illustrated embodiment, the subscriber 10 will have initially become a member of the AP network 16. As indicated in step 46, the subscriber 10 will have previously been configured with a first (or initial) network-layer address that is routable in the AP network 16 but not routable in the SP network 28 to which the subscriber 10 is to be added. In one embodiment, the previous configuration may have been via a DHCP exchange between the subscriber 10 and a DHCP server 26 within the AP network 16, for example. In this case, the first network address will have been obtained on a "lease" basis, i.e., the subscriber's continued use of the address is subject to a requirement for periodic renewals. This aspect of the use of DHCP for address configuration is exploited in a later part of the process as described below.

Step 48 shows steps that are performed during an interim period in which the subscriber is still configured with the first network address but begins to access an SP network 28. Because the first network address is not routable in the SP network 28, any IP packets generated by the subscriber 10 are not permitted to simply pass into the SP network 28 without modification. Due to its monitoring of DHCP traffic, the service gateway 18 knows that the subscriber 10 will eventually need to renew the lease on its network address, and at that point the service gateway 18 can provide the subscriber 10 with a new network address that is routable in the SP network. In the interim period until that action is taken, the service gateway 18 performs the two steps 50 and 52.

In step 50, the DHCP logic 42 of the service gateway 18 obtains, on behalf of the subscriber 10, a second network address that is routable in the SP network 28. It can do this, for example, by employing a "proxy client" function to make a request to a DHCP server within the SP network 28. The DHCP server then returns a DHCP reply including the second network address in accordance with the DHCP protocol. The DHCP logic 42 stores this second network address in temporary storage until it is later provided to the subscriber 10, as described below. As an alternative to the use of a remote DHCP server, the DHCP logic 42 may have access to a local pool of allocable network addresses for the SP network 28, in which case it merely allocates one for use by the subscriber 10.

In step 52, the NAT logic 44 of the service gateway 18 performs NAT to translate between the subscriber data packets and corresponding network data packets in the SP network. Each SP network data packet includes the same information as a corresponding subscriber data packet, but the subscriber 10 is identified by the second network address (obtained in step 50) instead of the first network address. Thus, for packets flowing from the subscriber 10 into the SP network 28, the second network address is substituted for the first network address in the source address field of the packet. For packets flowing in the other direction, the first network address is substituted for the second network address in the destination address field of the packet.

The NAT operation of step 52 continues until the time that the subscriber 10 is successfully re-configured with the second network address, as is now described. In step 54, the subscriber 10 reaches an operating condition in which the subscriber can become configured with a new network address. As indicated above, this occurs in the illustrated embodiment when the DHCP lease on the first network address is about to expire. In accordance with the DHCP protocol, the subscriber 10 attempts to renew the lease on the first network address prior to the time that it expires. The DHCP logic 42 intercepts this renewal request and returns a negative acknowledgement, indicating to the subscriber that the request has been denied. When the lease period subsequently ends, the subscriber 10 automatically issues a new DHCP Discover message in an attempt to obtain a new network address. At this point the subscriber 10 is ready to receive the second network address previously obtained in step 50 as described above.

It should be noted that the service gateway 18 may issue a DHCP FORCE RENEW message to the subscriber 10 to force the subscriber 10 to immediately renew its address lease rather than waiting until the normal renewal time. This functionality may not be supported by all subscribers, however, and thus in any particular embodiment such functionality may not be present or may be utilized only in a selective manner based on the capabilities of the subscribers 10.

In step 56 of FIG. 4, the DHCP logic 42 provides the second network address to the subscriber 10 for use in exchanging future data packets with the SP network. The subscriber subsequently utilizes the second network address to identify itself in the source address field of outgoing packets, and likewise accepts packets that include the second network address in the destination address field. At this point, the operation of the address reassignment logic 40 is complete, and thus the NAT logic 44 is disabled or de-instantiated. As shown at step 58, the service gateway 18 subsequently permits direct, non-translated exchange of data packets between the subscriber 10 and the SP network 28.

As previously noted, the operation of the address reassignment process of FIG. 4 provides improved performance over traditional approaches such as NAT alone or DHCP alone with short lease times. NAT use is minimized by being limited to only the short interim period before the lease of the first network address expires. Additionally, certain problems associated with using very short DHCP lease times (including client compatibility and increased DHCP network traffic and server loading) are avoided. The process of FIG. 4 may be used in a variety of operating environments. One particular use is in support of dynamic transfer of a subscriber from one virtual private network (VPN) to another, as described below with reference to FIGS. 5 and 6.

Figure 5:
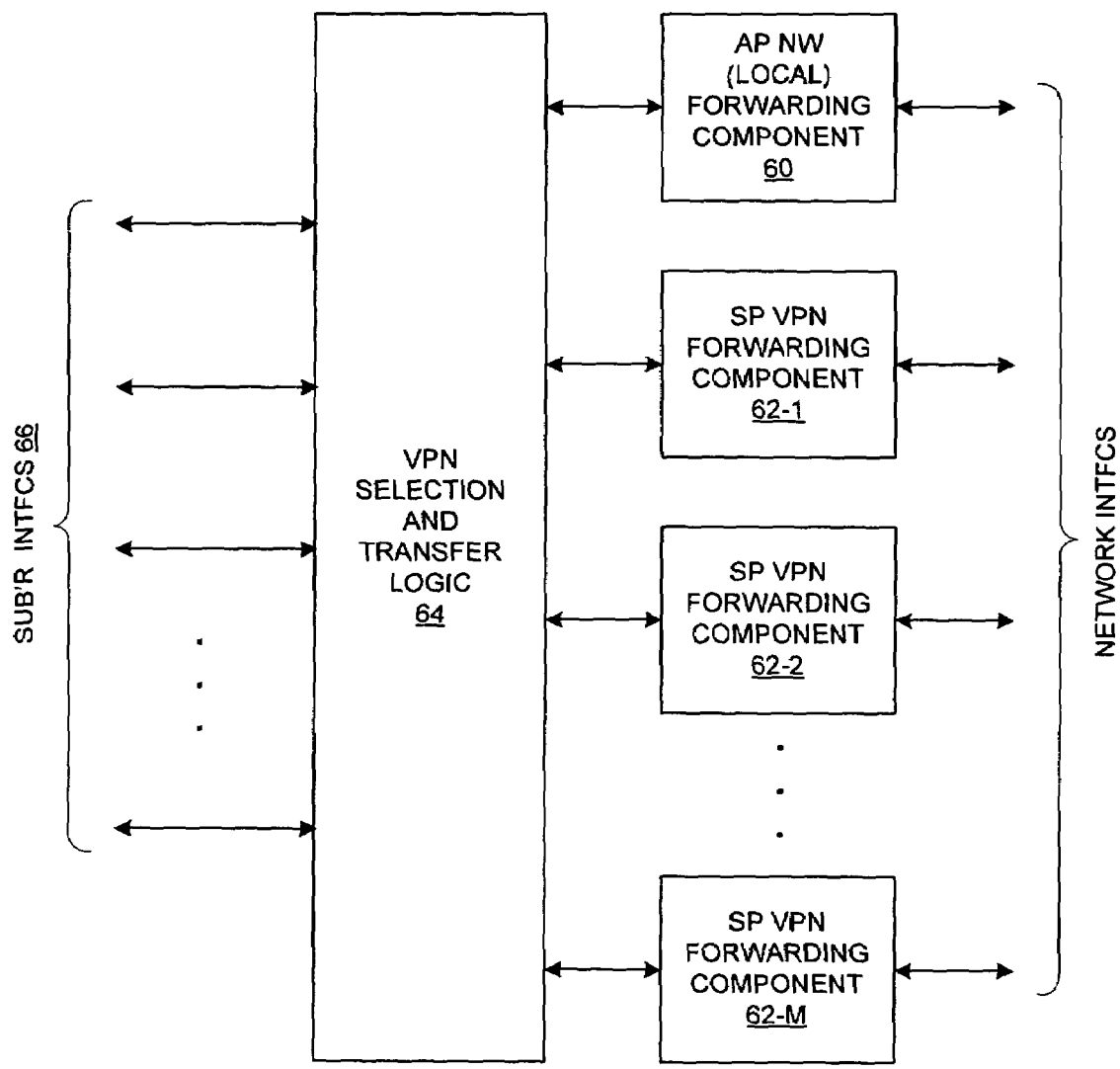
FIG. 5 is a block diagram of operating software pertaining to virtual private network (VPN) selection and transfer in the service gateway of FIG. 2.

FIG. 5 is a block diagram of certain operating software executed by the processor of the service gateway 18. The software includes an AP network (AP NW) "forwarding component" 60 as well as multiple SP VPN forwarding components 42 (shown as 62-1, 62-2, ..., 62-M). In the present context, the term "forwarding component" generally refers to logic that performs a routing and/or forwarding operation on data packets belonging to a particular virtual private network (VPN). It may be implemented, for example, as a virtual routing and forwarding (VRF) instance in connection with layer-3 VPNs, or as bridging or switching logic for layer-2 VPNs. VPN selection and transfer logic 64 is disposed between the forwarding components 60, 62 and a plurality of interfaces 46 to the subscribers 10. The subscriber interfaces 66 are generally virtual or logical, and typically there are additional interfaces (not shown) to underlying physical communications media (such as the communications links 12) on which the subscriber interfaces 66 are defined. As an example, a particular link 12 might be an Asynchronous Transfer Mode (ATM) link, and the subscriber interfaces 66 associated with that link 12 correspond to individual virtual connections of the ATM link.

Each forwarding component 60, 62 maintains a respective forwarding database for the associated network 16 or 28. There may also be an associated forwarding table derived from the forwarding database and utilized by the port adapters 32 in forwarding packets from ingress ports to egress ports of the service gateway 18. In general, the different forwarding components 60, 62 are entirely distinct from each other, as are the networks 16 and 28. There may be some overlap of entry information where there is corresponding overlap among the networks 16, 28, such as for routers or other devices that carry traffic crossing between different networks 16, 28. It will be appreciated that the AP NW forwarding component 60 may have much more limited functionality than the SP NW forwarding components 62, due to its more limited role as part of initial subscriber access to the system. Indeed, in an alternative embodiment there may be no need for an explicit AP NW forwarding component 60.

Figure 6:
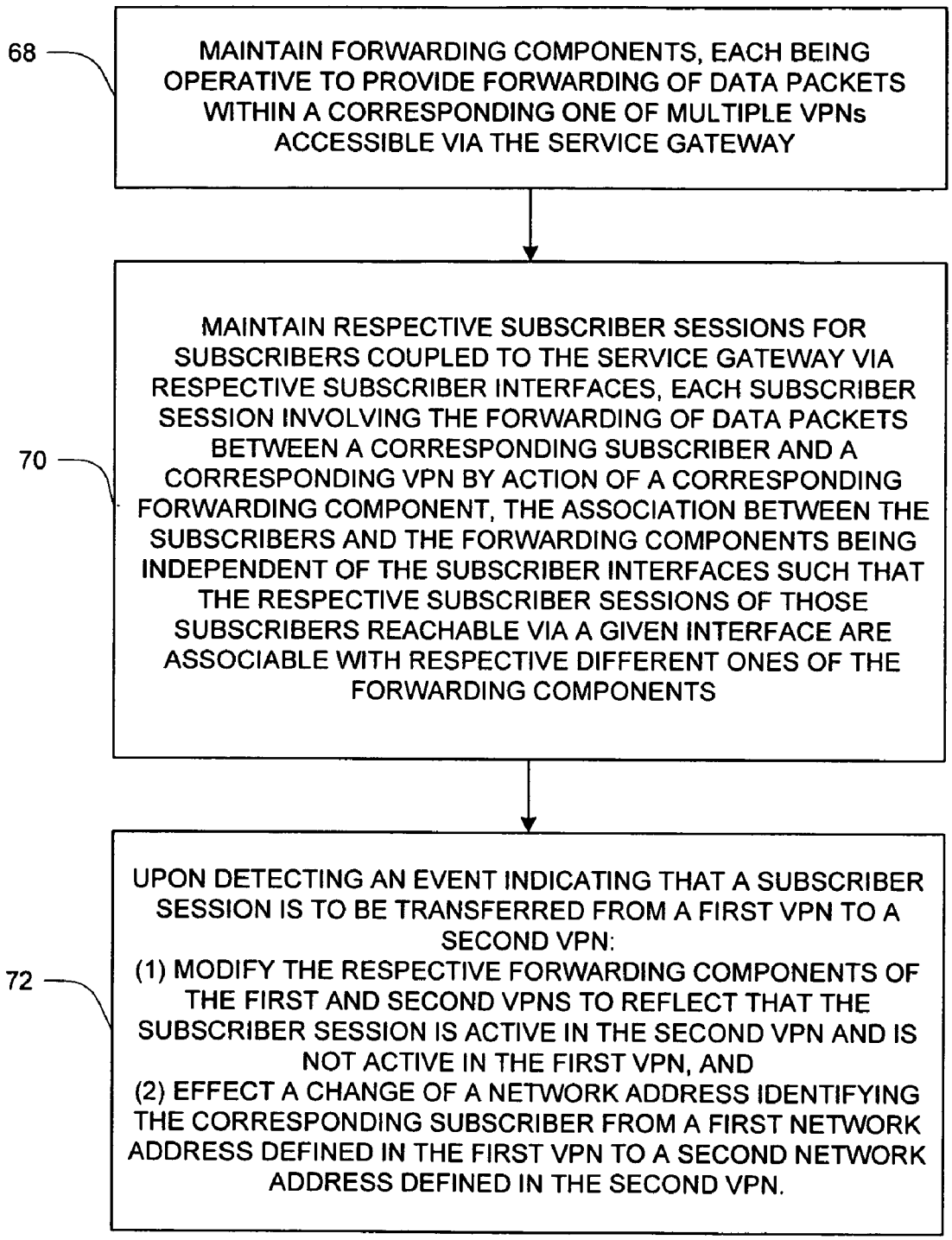
FIG. 6 is a flow diagram depicting operation of the operating software of FIG. 5.

FIG. 6 illustrates a method by which the VPN selection and transfer logic 64 works. In step 68, the VPN selection and transfer logic 64 maintains a plurality of forwarding components such as forwarding components 60, 62, wherein each forwarding component is operative to provide forwarding of data packets within a corresponding one of a plurality of virtual private networks (VPNs) accessible via the service gateway (e.g., SP networks 28).

In step 70, the VPN selection and transfer logic 44 maintains respective subscriber sessions for a plurality of subscribers coupled to the service gateway via respective subscriber interfaces. Each subscriber session involves the forwarding of data packets between a corresponding subscriber and a corresponding VPN by action of a corresponding forwarding component. The association between the subscribers and the forwarding components is independent of the subscriber interfaces, such that the subscriber sessions of those subscribers reachable via a given subscriber interface may be associated with respective different ones of the forwarding components.

In step 72, upon detecting an event indicating that a subscriber session is to be transferred from a first VPN to a second VPN, the VPN selection and transfer logic 64 modifies the respective forwarding components of the first and second VPNs to reflect that the subscriber session is active in the second VPN and is not active in the first VPN, and may also effect a change of a network address identifying the corresponding subscriber from a first network address defined in the first VPN to a second network address defined in the second VPN. The event in step 72 may take the form, for example, of a subscriber's selection of a new service (e.g., at the web portal 24), a control policy action, or termination of a network service (e.g. due to prepaid credit exhaustion or the detection of improper service usage). Upon completion of the transfer, subscriber traffic is routed using an SP NW forwarding component 62 associated with the selected SP network 28 (e.g., SP NW forwarding component 62-2).

Upon completion of step 72 of FIG. 6, the VPN selection and transfer logic 64 operates in conjunction with the forwarding component 62 of the new VPN to perform packet routing/forwarding and related functions in the context of the selected service. The VPN selection and transfer logic 64 maintains an association between the subscriber 10 and the forwarding component 62 for the newly selected network service. When a packet is received from the subscriber, it is forwarded toward a destination according to routing/forwarding information of the associated forwarding component 62. Similarly, when a packet is received from an SP network 28, it is forwarded toward the destination subscriber 10 according to routing/forwarding information of the associated forwarding component 62. Other functions such as packet filtering, monitoring, statistics gathering etc. may also be performed in accordance with the service that specifies the VPN.

With respect to assigning a new network address in step 72 of the process of FIG. 6, different types of address-reassignment mechanisms may be employed for this operation based on the type of the subscriber session. In some cases the address-reassignment mechanism may result in the subscriber becoming configured with a new network address that the subscriber utilizes in subsequent network communications packets. The use of DHCP for IP sessions is an example. In other cases a translation or substitution, such as NAT, may be utilized. Where the capability exists, the above-described method of FIG. 4 may be advantageously employed to realize the benefits of dynamic re-configuration of the subscriber while avoiding certain drawbacks, notably the possibility of dead time while waiting for the subscriber to relinquish its original network address and accept a new one. In the method of FIG. 4, this benefit is obtained by using interim NAT during the remainder of the lease period for the initial network address.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method of adding a subscriber to a virtual private network (VPN), the subscriber having previously been configured with a first network address that is not routable in the VPN, the method comprising:
   (1) during an interim period in which the subscriber attempts to exchange subscriber data packets with the VPN using the first network address:
      (a) obtaining, on behalf of the subscriber, a second network address that is routable in the VPN; and
      (b) performing network address translation to translate between the subscriber data packets having the first network address and corresponding network data packets in the VPN, each network data packet including the same information as a corresponding subscriber data packet but identifying the subscriber by the second network address instead of the first network address; and
   (2) upon the subscriber reaching an operating condition in which the subscriber can become configured with a new network address:
      (a) providing the second network address to the subscriber for use by the subscriber in exchanging future data packets with the VPN; and
      (b) subsequently permitting direct, non-translated exchange of the future data packets between the subscriber and the VPN,
   wherein:
      (i) providing the second network address to the subscriber includes providing the second network address as part of a response indicating that the second network address is to be used in a source address field of the subscriber data packets to identify the subscriber in the VPN; and
      (ii) subsequently permitting direct, non-translated exchange of the future data packets between the subscriber and the VPN includes receiving the subscriber data packets from the subscriber which include the second network address in the source address field and refraining from performing the network address translation to the second network address in the source address field of the received subscriber data packets.

2. A method according to claim 1, wherein
   obtaining the second network address comprises utilizing a proxy client capability of a dynamic network address assignment protocol;
   the subscriber obtains the first network address on a temporary lease basis and reaches the operating condition when the temporary lease of the first network address is about to expire; and
   providing the second network address to the subscriber comprises:
      (1) rejecting an attempt by the subscriber to renew the lease of the first network address; and
      (2) providing the second network address to the subscriber in response to a subsequent request by the subscriber for a new network address.

3. A method according to claim 2, wherein:
   the VPN is a second VPN separate from a first VPN in which the first network address is routable; and
   the subscriber communicates in the first VPN during an initial period preceding the interim period.

4. A method according to claim 1, wherein:
   the VPN is a service provider (SP) network separate from and reachable via an access provider (AP) network in which the first network address is routable; and
   the subscriber has a direct physical connection to the AP network but not to the SP network.

5. A method according to claim 4, wherein:
   the SP network requires an initial authorization of the subscriber before the subscriber is permitted to join the SP network; and
   the AP network includes an authorization server operative to authorize the subscriber to the SP network.

6. A method according to claim 1, wherein the VPN is one of a plurality of VPNs, and further comprising:
   maintaining a plurality of forwarding components each operative to provide routing and forwarding of data packets within a corresponding one of the VPNs;
   detecting an event indicating that the subscriber is to become part of a selected one of the VPNs, the subscriber being reachable via a subscriber interface; and
   upon detecting the event, modifying the forwarding component of the selected VPN to include respective forwarding entries, the forwarding entries including (1) the second network address and (2) an identifier of the subscriber interface, the forwarding entries being operative to effect forwarding of data packets between the subscriber and the selected VPN using the second network address to identify the subscriber.

7. A method according to claim 1, wherein the response is a response to a DHCP discovery request issued by the subscriber.

8. A service gateway for adding a subscriber to a virtual private network (VPN), the subscriber having previously been configured with a first network address that is not routable in the VPN, the service gateway comprising:
   a plurality of port adapters for interfacing with subscribers and with the VPN;
   a switch fabric operative to forward packets from ingress ports to egress ports of the port adapters; and
   a processor operative to:
      (1) during an interim period in which the subscriber attempts to exchange subscriber data packets with the VPN using the first network address:
         (a) obtain, on behalf of the subscriber, a second network address that is routable in the VPN; and
         (b) perform network address translation to translate between the subscriber data packets having the first network address and corresponding network data packets in the VPN, each network data packet including the same information as a corresponding subscriber data packet but identifying the subscriber by the second network address instead of the first network address; and
      (2) upon the subscriber reaching an operating condition in which the subscriber can become configured with a new network address:
         (a) provide the second network address to the subscriber for use by the subscriber in exchanging future data packets with the VPN; and (b) subsequently permit direct, non-translated exchange of the future data packets between the subscriber and the VPN, wherein:
(i) the processor is operative when providing the second network address to the subscriber to provide the second network address as part of a response indicating that the second network address is to be used in a source address field of the subscriber data packets to identify the subscriber in the VPN; and
(ii) subsequently permitting direct, non-translated exchange of the future data packets between the subscriber and the VPN includes receiving the subscriber data packets from the subscriber which include the second network address in the source address field and refraining from performing the network address translation to the second network address in the source address field of the received subscriber data packets.

9. A service gateway according to claim 8, wherein:
the processor is operative when obtaining the second network address to utilize a proxy client capability of a dynamic network address assignment protocol;
the subscriber obtains the first network address on a temporary lease basis and reaches the operating condition when the temporary lease of the first network address is about to expire; and
the processor is operative when providing the second network address to the subscriber to:
(1) reject an attempt by the subscriber to renew the lease of the first network address; and
(2) provide the second network address to the subscriber in response to a subsequent request by the subscriber for a new network address.

10. A service gateway according to claim 9, wherein:
the VPN is a second VPN separate from a first VPN in which the first network address is routable; and
the subscriber communicates in the first VPN during an initial period preceding the interim period.

11. A service gateway according to claim 8, wherein:
the service gateway is configured for use in an access provider (AP) network in which the first network address is routable and provides a direct physical connection to the subscriber; and
the VPN is a service provider (SP) network separate from and reachable via the AP network, the SP network lacking a direct physical connection to the subscriber.

12. A service gateway according to claim 11, wherein:
the SP network requires an initial authorization of the subscriber before the subscriber is permitted to join the SP network; and
the service gateway is coupled to an authorization server of the AP network, the authorization server being operative to authorize the subscriber to the SP network.

13. A service gateway according to claim 8, wherein the VPN is one of a plurality of VPNs, and wherein the processor is further operative to:
maintain a plurality of forwarding components each operative to provide routing and forwarding of data packets within a corresponding one of the VPNs;
detect an event indicating that the subscriber is to become part of a selected one of the VPNs, the subscriber being reachable via a subscriber interface; and
upon detecting the event, to modify the forwarding component of the selected VPN to include respective forwarding entries, the forwarding entries including (1) the second network address and (2) an identifier of the subscriber interface, the forwarding entries being operative to effect forwarding of data packets between the subscriber and the selected VPN using the second network address to identify the subscriber.

14. A service gateway according to claim 8, wherein the response is a response to a DHCP discovery request issued by the subscriber.

15. A service gateway for adding a subscriber to a virtual private network (VPN), the subscriber having previously been configured with a first network address that is not routable in the VPN, the service gateway comprising:
means for interfacing with subscribers and with the VPN;
means for forwarding packets from ingress ports to egress ports of the port adapters;
means, operative during an interim period in which the subscriber attempts to exchange subscriber data packets with the VPN using the first network address, for:
(a) obtaining, on behalf of the subscriber, a second network address that is routable in the VPN; and
(b) performing network address translation to translate between the subscriber data packets having the first network address and corresponding network data packets in the VPN, each network data packet including the same information as a corresponding subscriber data packet but identifying the subscriber by the second network address instead of the first network address; and
means, operative upon the subscriber reaching an operating condition in which the subscriber can become configured with a new network address, for:
(a) providing the second network address to the subscriber for use by the subscriber in exchanging future data packets with the VPN; and
(b) subsequently permitting direct, non-translated exchange of the future data packets between the subscriber and the VPN, wherein:
(i) providing the second network address to the subscriber includes providing the second network address as part of a response indicating that the second network address is to be used in a source address field of the subscriber data packets to identify the subscriber in the VPN; and
(ii) subsequently permitting direct, non-translated exchange of the future data packets between the subscriber and the VPN includes receiving the subscriber data packets from the subscriber which include the second network address in the source address field and refraining from performing the network address translation to the second network address in the source address field of the received subscriber data packets.

16. A service gateway according to claim 15, wherein:
obtaining the second network address includes utilizing a proxy client capability of a dynamic network address assignment protocol;
the subscriber obtains the first network address on a temporary lease basis and reaches the operating condition when the temporary lease of the first network address is about to expire; and
providing the second network address to the subscriber includes:
(1) rejecting an attempt by the subscriber to renew the lease of the first network address; and
(2) providing the second network address to the subscriber in response to a subsequent request by the subscriber for a new network address.

17. A service gateway according to claim 15, wherein:
the VPN is a service provider (SP) network separate from and reachable via an access provider (AP) network in which the first network address is routable; and
the subscriber has a direct physical connection to the AP network but not to the SP network.

18. A service gateway according to claim 17, wherein:
the SP network requires an initial authorization of the subscriber before the subscriber is permitted to join the SP network; and
the AP network includes an authorization server operative to authorize the subscriber to the SP network.

19. A service gateway according to claim 15, wherein the VPN is one of a plurality of VPNs, and further comprising:
means for maintaining a plurality of forwarding components each operative to provide routing and forwarding of data packets within a corresponding one of the VPNs;
means for detecting an event indicating that the subscriber is to become part of a selected one of the VPNs, the subscriber being reachable via a subscriber interface; and
means active, upon detecting the event, for modifying the forwarding component of the selected VPN to include respective forwarding entries, the forwarding entries including (1) the second network address and (2) an identifier of the subscriber interface, the forwarding entries being operative to effect forwarding of data packets between the subscriber and the selected VPN using the second network address to identify the subscriber.

20. A service gateway according to claim 15, wherein the response is a response to a DHCP discovery request issued by the subscriber.

* * * * *